May 4, 1948. J. P. BROWN 2,440,713
GYROSCOPIC CONTROL APPARATUS FOR AIR AND OTHER CRAFT
Filed Sept. 18, 1944 3 Sheets-Sheet 1

Inventor
J. P. BROWN
By
Emery Holcombe Blair
Attorneys

May 4, 1948.                J. P. BROWN                2,440,713
         GYROSCOPIC CONTROL APPARATUS FOR AIR AND OTHER CRAFT
                Filed Sept. 18, 1944        3 Sheets-Sheet 2

Inventor
J. P. BROWN
By
Attorneys

May 4, 1948.  J. P. BROWN  2,440,713
GYROSCOPIC CONTROL APPARATUS FOR AIR AND OTHER CRAFT
Filed Sept. 18, 1944  3 Sheets-Sheet 3

Inventor
J. P. BROWN
By
Emery Holcombe & Blair
Attorneys

Patented May 4, 1948

2,440,713

UNITED STATES PATENT OFFICE 2,440,713

GYROSCOPIC CONTROL APPARATUS FOR AIR AND OTHER CRAFT

John Pollock Brown, Croydon, England

Application September 18, 1944, Serial No. 554,701
In Great Britain April 30, 1943

8 Claims. (Cl. 114—144)

This invention relates to gyroscopic control apparatus applicable to air or other craft. An example of the apparatus to which the invention may be applied is described in the specification of the present inventor's United States of America Letters Patent No. 2,036,914, though it is to be understood that it may be used with other constructions of gyroscopic apparatus employed for like purposes.

In the construction described in the specification of the above mentioned patent the rotor of the gyroscope is mounted with a spherical cup bearing on a ball carried on the end of a spindle which is driven by suitable means the drive being transmitted by slipping fluid friction to the rotor so that the latter is free to change its angular position with respect to the driving spindle. The rotor with its driving spindle and the valves controlling servomotors are mounted on a cradle which is itself supported so as to be movable about two axes at right angles to each other on a base plate. The rotor controls the valves of servomotors which move the cradle about each of these axes which may be referred to as the axes of control. On deflection of the base plate, that is to say if the craft in which the apparatus is mounted deviates from its set course, these servomotors operate to bring the driving spindle again into alignment with the axis of the rotor and in so doing the valves of the servomotors are restored to their normal positions. At the same time and through suitable servomotor mechanism the navigating controls of the craft are actuated in such a sense as to keep the desired attitude of the craft, that is to say to maintain the craft on its course and in the case of an aircraft to also maintain its altitude. In this construction the control of the valves of the servomotors is effected automatically by the rotor by providing the rotor with a projection which extends from its centre coincident with its axis and in a direction opposite to the driving spindle. This projecting arm engages two light forks which lie at right angles to each other and in a common plane which is normal to the axis of the driving spindle. Each of these forks is so mounted that it can be moved in the plane in which it lies by the arm projecting from the rotor if the axis of the driving spindle is caused to deviate from coincidence with the axis of the rotor. Such movement of a fork will actuate the valves controlling a servomotor which acting through suitable mechanism will swing the cradle through one of the axes about which it can be turned and thus restore alignment between the driving spindle and the axis of the rotor and thereby at the same time restore to their normal positions the valves which had been displaced by the deflection with respect to the axis of the rotor. This deflection will have been due to a movement of the craft, either in azimuth or in altitude, from its correct or set attitude or course. The servomotors function either directly or through relays to operate the navigational controls necessary to bring the craft back to its correct attitude. In the existing arrangement the construction produces action by the servomotors which is proportionate to the deflection of the rotor and effects a corresponding operational control of the craft. Owing, however, to the mass of the craft which must develop momentum when a disturbance occurs leading to a deviation from the set course, this control cannot adequately deal with or damp down an excessive disturbance such as the rapid yawing of a craft whether aircraft or ship. The present invention provides means whereby this difficulty can be effectively dealt with automatically.

According to this invention in directional control apparatus of the type indicated above there is combined with a servomotor operating direction controlling mechanism, means which as and when deviation from a set course has occurred tend to restore to normal positions the displaced parts of the apparatus and through it check and bring the craft back on to its course, and means which by offering a resistance cause automatically a delay in the restoration of the apparatus for the purpose of dealing effectively with excessive rate of yaw and like movement of the craft controlled by the apparatus. The resistance which thus delays the restoration to normal comprises a retarding device associated with the mechanism for restoring the valve by which is controlled the operation of the servomotor which transmits the movements necessary to bring about the restoration of the craft with a minimum of oscillation about its set course. There is a yielding connection between the servomotor operating the navigating control apparatus and the mechanism which includes an intermediate lever and a floating lever associated with the retarding device by which mechanism the valves of that servomotor are actuated and restored to their normal positions. The yielding connection is constituted by a rod with a member carrying a pin or the like slidable on the rod the pin serving to couple the parts and the movement of the pin-carrying member along the rod being between springs which lie on each side of the pin but permit it to occupy a definitely neutral position between them while they provide resilience in the connection when the rod is moved in the direction of its length. The retarding device may comprise a suitable device offering resistance to the restoring movement of the displaced parts to their normal positions.

Since in this case it is really necessary to separate the mechanism by which the cradle or rotor casing is swung to restore to normal the alignment of the rotor axis with the driving spindle after an ordinary deflection from the mechanism by which excessive yaw and like deflection is dealt with, the latter mechanism is in effect superimposed on the cradle swinging mechanism which functions much as in the earlier construction of the apparatus as described in the specification of the patent referred to above. That is to say the arm projecting from the rotor acting through a light fork actuates the valves of a servomotor which imparts the necessary swinging movement to the cradle and at the same time acting through relay valves brings into operation the servomotor which operates the navigating control mechanism. It is thus between this latter servomotor and the retarding device that there is arranged the yielding connection to the means by which the valves of this servomotor are restored to normal with the delay due to the inertia device.

The accompanying drawings illustrate the improved arrangement diagrammatically and by way of example. In these drawings.

Figure 1:
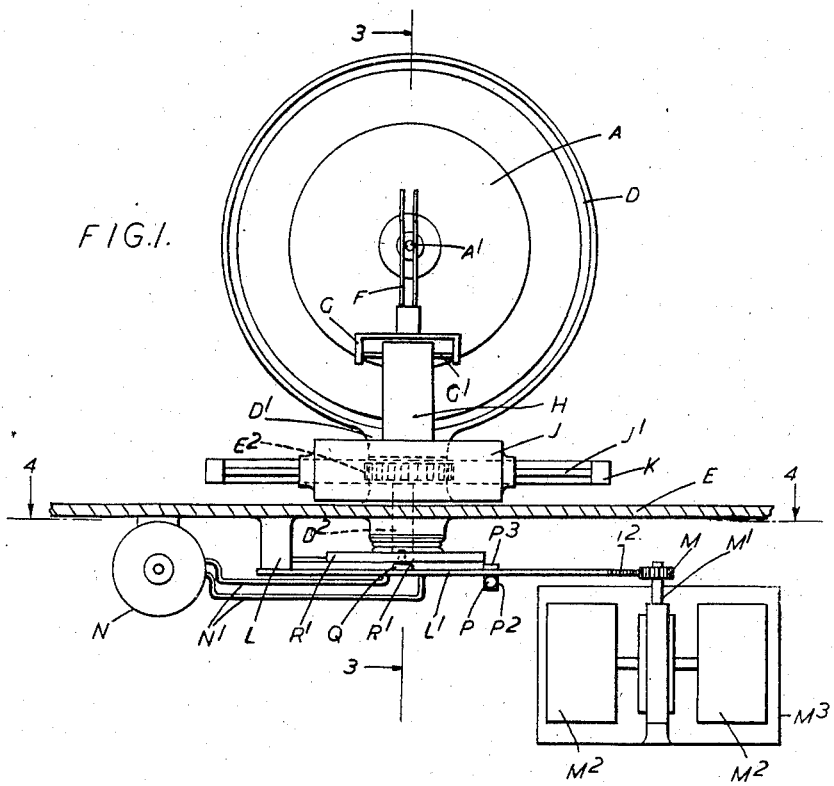
Figure 1 is an elevation of the apparatus looking on the face of the rotor.
Figure 2:
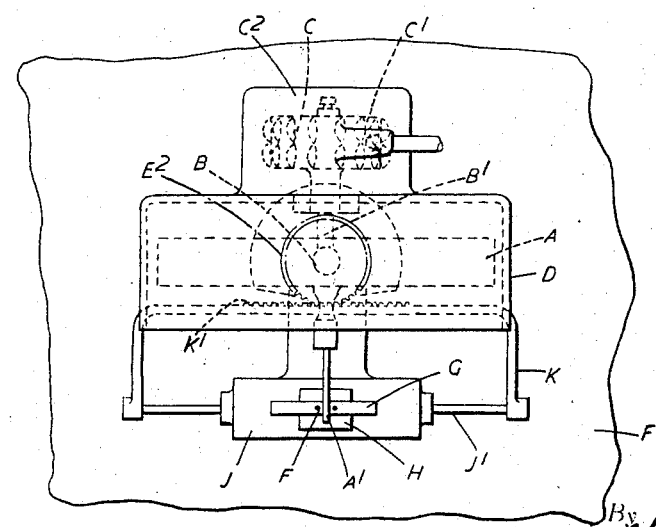
Figure 2 is a plan.
Figure 3:
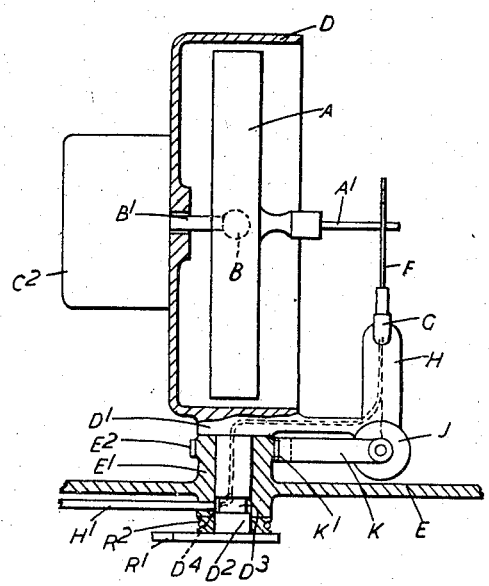
Figure 3 is a part-sectional elevation on the line 3—3 in Figure 1 looking in the direction of the arrows and omitting some of the parts below the base plate.

As in the known construction mentioned above, the rotor A of the gyroscope is driven with slipping fluid friction through a cup carried by the rotor and enclosing a ball B mounted on the end of a spindle $B^1$ which is driven by a turbine C impelled by oil delivered under pressure through a jet $C^1$. This driving mechanism is arranged in a casing $C^2$ attached to a main driving D which encloses the rotor A and is itself provided on its under side with a boss $D^1$ and spindle $D^2$ by which it is rotatably carried on a base plate E. The spindle rotates in a sleeve $E^1$ fixed on the base plate E and on its upper end this sleeve carries fixed thereon a pinion $E^2$. The rotor A has an arm $A^1$ which projects along its axis from the side opposite to the driving spindle $B^1$ and this arm engages a light fork F carried by a U-shaped member G. A guide rod $G^1$ runs between the arms of this member G and passes through and can slide in a casing H within which are valves actuated by the sliding rod $G^1$, these valves controlling the flow of pressure liquid supplied through a pipe $H^1$ to and from a servomotor cylinder J on which the valve casing H is disposed, the servomotor being attached to and carried by the lower part of the casing D and its boss $D^1$. The rod $J^1$ of the piston of the servomotor extends through each end of the cylinder and connects the arms of a U-shaped member K which slides with the servo piston and carries a toothed rack $K^1$ in engagement with the pinion on the fixed sleeve $E^2$. Alteration of the course of the craft in which the apparatus is installed will cause the driving spindle $B^1$ to deviate from alignment with the arm $A^1$ of the rotor A and as a result the fork F with the sliding valve-actuating member $GG^1$ will be moved relatively to the valve casing H and pressure liquid will be permitted to flow to the servomotor J. This will move the rack member $KK^1$ and by its engagement with the fixed pinion $E^2$ the whole rotor casing D will be turned in azimuth. The pressure liquid flows from the supply pipe $H^1$ to the valves in the casing H by way of an annular space formed by reducing the diameter of the spindle $D^2$ as at $D^3$ whence a passage indicated by the dotted line $D^4$ runs through the spindle $D^2$, the boss $D^1$ and the valve casing H.

As the rotation of the rotor casing takes place there will be actuated the valves of a servomotor which is so operative on the steering mechanism of the craft as to restore it to its proper course. The actuation of these valves and the operation of this servomotor is controlled in the improved manner by the retarding device and mechanism to be described.

In the construction as shown there is pivoted at L conveniently on the underside of the base plate E an intermediate lever $L^1$ on the end of which is a toothed quadrant $L^2$ and this engages a pinion M on a rotatable shaft $M^1$ which carries a set of paddles $M^2$ enclosed in a casing $M^3$ which may contain a liquid. This device is placed in some convenient position in relation to the main apparatus. Thus the resistance of the paddles will have a retarding effect upon movement of the lever $L^1$.

Figure 5:
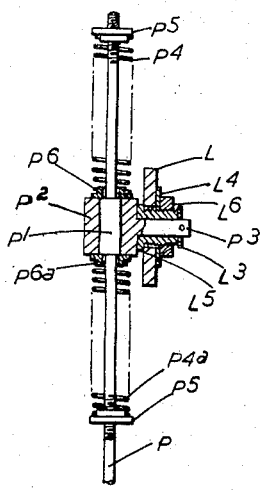
Figure 5 is a longitudinal sectional elevation on the line 5—5 in Figure 4 showing on an enlarged scale the arrangement of the yielding connection between certain parts.
Figure 4:
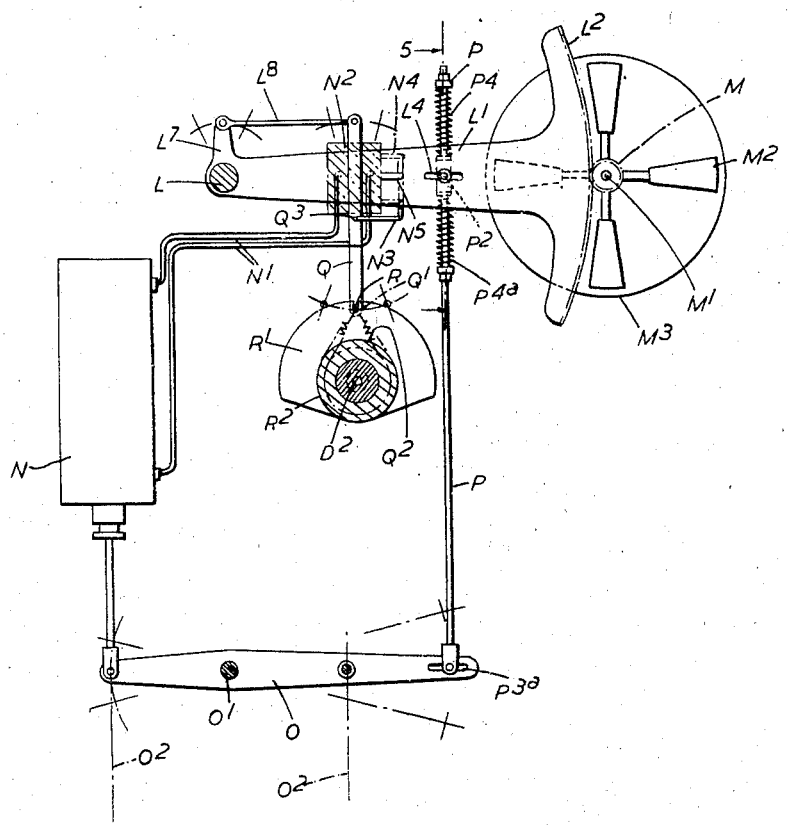
Figure 4 is a sectional plan on the line 4—4 in Figure 1 looking in the direction of the arrows.

A servomotor N mounted in some convenient place in the craft, but here shown as fixed on the underside of the base plate E, acts on one arm of a lever O pivoted at $O^1$ and both arms of this lever are respectively connected by suitable means as at $O^2$ with the rudder or other directional control mechanism of the craft. The second arm of the lever O is connected through a rod P with the lever $L^1$ the connection being a yielding one, of which the details are shown in Figure 5. As there seen a cylindrical enlargement $P^1$ on the rod P passes through and can slide in a sleeve $P^2$ from which projects laterally a pin $P^3$. This pin can turn freely in a sleeve $L^3$ which passes through and can be fixed in any position along a slot $L^4$ in the lever $L^1$. The sleeve has a flange $L^5$ at one end and by means of a nut screwed on to the other end it can be fixed in the desired place along the slot thus providing an adjustment in the leverage ratio. A similar pin and slot connection is conveniently provided at $P^{3a}$ between the end of the rod P and the arm of the lever O. Around the parts of the rod P which lie on each side of the enlargement $P^1$ and of the pin-carrying sleeve $P^2$ are two coiled springs $P^4$ and $P^{4a}$. Each of these springs abuts at one end against a collar $P^5$ adjustably fixed on the rod P, and at the other end against a collar $P^6$ or $P^{6a}$ carried loosely on the rod P. This loose collar can abut against the adjacent end face of the enlargement $P^1$ or the end face of the sleeve $P^2$. The arrangement is such that in the normal state of the parts the two springs $P^4$ and $P^{4a}$ are equally compressed and act similarly to maintain constant the positional relationship between the levers $L^1$ and O, but if by some sudden or rapid action of the servomotor N the lever O is turned, say, in a clockwise direction, as seen in Figure 4, the pull exerted on the rod P will cause the enlargement P¹ to slide out from one end on the sleeve P² owing to the resistance offered to movement of the lever L¹ by the retarding device M². One spring P⁴ᵃ will then be carried as a whole with the rod owing to the loose collar P⁶ᵃ butting up against the end face of the enlargement P¹, but the other spring P⁴ will be compressed between the fixed collar P⁵ on the rod and the end face of the sleeve P² against which the loose collar P⁶ will then abut. A force will thus be applied to the lever L¹, but its movement will be delayed by the retarding device M². Owing to this delayed action the servomotor N as a result of the craft yawing in the opposite direction, may have been caused to impart a counterclockwise movement of the lever O before there can have taken place movement of the lever L¹ corresponding to the first clockwise movement of the lever O. If the servomotor N is caused to move the lever O slowly, then a corresponding movement of the lever L¹ will be effected more readily.

The valves which control the flow of pressure liquid through the pipes N¹ to the servomotor N are situated in a casing N² and actuated by movement of a floating lever Q in the following manner. The lever L¹ is provided with a second arm L⁷ which is connected through a link L⁸ to one end of the lever Q. At its other end this lever engages through a pin Q¹ a notch R formed in the periphery of a disc R¹ fixed on the spindle D² of the rotatable casing D. A coiled spring Q² is attached at its ends to the pin Q¹ being passed round a grooved wheel R² carried by the disc R¹ and thus mounted on the spindle D². If the casing D with its spindle and the disc R¹ is turned the lever Q will be swung in one direction or the other against the action of the spring Q². At a point Q³ intermediate in the length of the floating lever Q it is connected for instance through a link N³ or some equivalent linkage structure with a lever N⁴ which as it is moved about its pivot N⁵ will actuate the valve or valves in the casing N² which control the flow of pressure liquid to the servomotor N. This arrangement may conveniently be referred to as the valve-operating linkage.

The improved apparatus operates in the following manner when installed, say, in a seacraft. If the craft yaws, for example, to port, the whole apparatus will swing to port with the craft, but as the rotor A will not partake in this movement the driving spindle B¹ will then be out of alignment with the rotor arm A¹. The latter acting through the fork F will move the valve in the casing H and cause the servomotor J to move the rack K¹ and thereby turn the rotor casing D in azimuth so as to restore alignment between the driving spindle and rotor arm. If this servomotor was connected to the mechanism for actuating the rudder, as in the known apparatus, the servomotor as it turns the casing D would apply helm to the rudder in the sense necessary to bring the craft back on to its course. This action of the rudder would cause a swinging movement of the whole apparatus to starboard with the craft then causing displacement of the valve and consequent rudder action and as realignment between the driving spindle and the rotor arm is reached the valve of the servomotor J in the casing H will be restored to its normal position as the rudder comes amidships.

In the present apparatus, however, the yawing of the craft and the accompanying movement of the apparatus brings about movement of the valve of the second servomotor N and thus through this servo indirectly operates the rudder by the servomotor acting on the lever O. Owing to the interconnection effected by the floating lever Q between firstly the casing D acting through its spindle D² and the disc R¹ on one end of the floating lever Q, secondly the lever L¹ L⁷ acting on the other end of the floating lever Q and itself controlled by the retarding device M² and actuated through the yielding connection and thirdly the linkage N³ N⁴ operating the valves of the servomotor N, the restoration of the alignment between the driving spindle B¹ and the rotor arm A¹ will take place while retaining some degree of helm proportionate to the angle of yaw. The response of the craft must lag behind the actual movement of the rudder and without this means of delaying the restoration of the servomotor valves there will tend to be a hunting action with helm applied first on one hand and then on the other. Hence the more that the restoration of the valves of the servomotor N is delayed the more will this servomotor respond with a temporary action on the rudder and if this action is correlated to the rate of yaw then the application of helm will be adjusted to accord with this.

When the rate of yaw has been checked it will be reflected in the resilience in the linkage mechanism which performs the ordinary positional control of the valves of the servomotor N. For example, if the craft yaws rapidly enough to cause the apparatus to apply full helm of, say 30°, even if the yaw be checked when only 15° has been reached, the restoration of the valves of the servomotor N, owing to fading out of the rate of movement imparted through the resilient connection, will have a reaction on the rudder, through the valves and servomotor, by bringing these back to their normal positional relations.

If in the follow up movement of the casing D the disc R¹ is turned so far that the pin Q¹ on the end of the floating lever Q comes out of the notch R, this pin will lie on the periphery of the disc and the end of the lever Q will be held against further movement. The pin Q¹ will, however, drop back into the notch R as the disc turns back into its normal position and it will carry with it the end of the floating lever Q. As this lever turns about its other end which is connected to the lever arm L⁷ the valves in the casing N² will be set so as to cause the servomotor N to return the directional control mechanism to its normal position for maintenance of the true course.

The degree of resistance offered by the retarding device M² may be adjustable as for instance by providing known means for altering the angle of the blades or vanes.

The details of construction may be varied in accordance with requirements.

What I claim as my invention and desire to secure by Letters Patents is:

1. Gyroscopic apparatus for use in the control of air and other craft comprising in combination a rotor with means for driving it, a base rigidly mounted in the craft, a support for the rotor and its driving means this support being movable about at least one control axis with respect to the base, a servomotor operative to move this support about the said control axis, a valve controlling said servomotor and arranged for operation by movement of the rotor support relative to the base, a second servomotor operative on mechanism through which the course of the craft is determined, a valve controlling this second servomotor, means which when the craft deviates from its set course are operative through the said rotor to actuate the valve controlling the said first mentioned servomotor and cause it to turn the said rotor support about a control axis and in so doing actuate the valve controlling the said second servomotor whereby the mechanism which determines the course of the craft will be caused to restore the craft to its correct course, and means which offer a resistance to and cause automatically a delay in the restoration to normal positions of the elements that are displaced by such deviation.

2. Gyroscopic apparatus for use in the control of air and other craft comprising in combination a rotor with means for driving it, a base rigidly mounted in the craft, a support for the rotor and its driving means, this support being movable about at least one control axis with respect to the base, a servomotor operative to move this support about the said control axis, a valve controlling said servomotor and arranged for operation by movement of the rotor support relative to the base, a second servomotor operative on mechanism through which the course of the craft is determined, a valve controlling this second servomotor, means which when the craft deviates from its set course are operative through the said rotor to actuate the valve controlling the said first mentioned servomotor and cause it to turn the said rotor support about a control axis and in so doing actuate the valve controlling the said second servomotor whereby the mechanism which determines the course of the craft will be caused to restore the craft to its correct course, and a retarding device which is connected to the mechanism which actuates the valve of the said second servomotor and causes a resistance to and automatically delays the restoration to normal positions the elements that are displaced by such deviation.

3. Gyroscopic apparatus for use in the control of air and other craft comprising in combination a rotor with means for driving it, a base rigidly mounted in the craft, a support for the rotor and its driving means this support being movable about at least one control axis with respect to the base, a servomotor operative to move this support about the said control axis, a second servomotor operative on mechanism through which the course of the craft is determined, a valve controlling this second servomotor, a floating lever, means by which this lever is moved when as a result of the craft deviating from its set course the said support is moved about a control axis, a connection between this floating lever and the valve of the said second servomotor, a yielding connection between this floating lever and the mechanism operated by the said second servomotor which controls the course of the craft, movement of the said floating lever by the said means resulting in restoration to normal positions the elements of the apparatus displaced by such deviation in the apparatus as the deviation of the craft is checked and it is brought back on to its correct course, and means which offer a resistance to and cause automatically a delay in this restoration.

4. Gyroscopic apparatus for use in the control of air and other craft comprising in combination a rotor with means for driving it, a base rigidly mounted in the craft, a support for the rotor and its driving means, this support being movable about at least one control axis with respect to the base, a servomotor operative to move this support about the said control axis, a second servomotor operative on mechanism through which the course of the craft is determined, a valve controlling this second servomotor, a floating lever, means by which this lever is moved when as a result of the craft deviating from its set course the said support is moved about a control axis, a connection between this floating lever and the valve of the said second servomotor, an intermediate lever pivoted on the said base and connected to the said floating lever, means operative on this intermediate lever and offering a resistance to its movement, and a yielding connection between this intermediate lever and the mechanism operated by the said second servomotor which controls the course of the craft, movement of the said floating lever by the said intermediate lever resulting in restoration to normal positions the elements of the apparatus displaced by such deviation in the apparatus as the deviation of the craft is checked and it is brought back on to its course, but such restoration being delayed by the said resistance offered to the movement of the intermediate lever.

5. Gyroscopic apparatus for use in the control of air and other craft comprising in combination a rotor with means for driving it, a base rigidly mounted in the craft, a support for the rotor and its driving means, this support being carried by a vertical spindle constituting a control axis for the support, and the latter with the spindle being rotatable on the said base, a valve controlling said servomotor and arranged for operation by movement of the rotor support relative to the base, a servomotor operative to rotate the said spindle and support, a second servomotor operative on mechanism through which the course of the craft is determined, a valve controlling this second servomotor, means which when the craft deviates from its set course are operative through the said rotor to actuate the valve controlling the said first mentioned servomotor and cause it to rotate the said spindle and support carried thereby, means whereby this rotation of the spindle and support actuates the said valve controlling the said second servomotor which by operating on the mechanism which determines the course of the craft, will restore the craft to its correct course, and means which offer a resistance to and cause automatically a delay in the corresponding restoration to normal positions the elements of the apparatus displaced by such deviation in the apparatus.

6. Gyroscopic apparatus for use in the control of air and other craft comprising in combination a rotor with means for driving it, a base rigidly mounted in the craft, a support for the rotor and its driving means, this support being carried by a vertical spindle rotatable on the said base and constituting a control axis for the support, a servomotor operative to rotate the said spindle and support, a valve controlling said servomotor and arranged for operation by movement of the rotor support relative to the base, a second servomotor operative on mechanism through which the course of the craft is determined, a valve controlling this second servomotor, a floating lever, means which when the craft deviates from its set course are operative through the said rotor to actuate the valve controlling the said first mentioned servomotor and cause it to rotate the said spindle and the support carried thereby, a connection between the floating lever and the said spindle such that when as a result of the craft deviating from its set course the said support with its spindle is rotated movement will be imparted to the floating lever, a connection between this floating lever and the valve of the said second servomotor, a yielding connection between this floating lever and the mechanism operated by the said second servomotor which controls the course of the craft, movement of the said floating lever by the said means resulting in restoration to normal positions the elements of the apparatus displaced by such deviation in the apparatus as the deviation of the craft is checked and it is brought back on to its correct course by the action of the apparatus, and means which offer a resistance to and cause automatically a delay in this restoration.

7. Gyroscopic apparatus for use in the control of air and other craft comprising in combination a rotor with means for driving it, a base rigidly mounted in the craft, a support for the rotor and its driving means this support being movable about at least one control axis with respect to the base, a servomotor operative to move this support about the said control axis, a valve controlling said servomotor and arranged for operation by movement of the rotor support relative to the base, a second servomotor, a lever from which extend connections to operate the rudder of the craft, means by which this lever is moved by the said second servomotor and the course of the craft thereby determined, a valve controlling this second servomotor, means which when the craft deviates from its set course are operative through the said rotor to actuate the valve controlling the said first mentioned servomotor and cause it to turn the said rotor support about a control axis and in so doing actuate the valve controlling the said second servomotor and cause it to move the rudder operating lever and thereby restore the craft to its correct course, and means which offer a resistance to and cause a delay in the resultant restoration to normal positions the elements of the apparatus displaced by such deviation in the apparatus.

8. Gyroscopic apparatus for use in the control of air and other craft comprising in combination a rotor with means for driving it, a base rigidly mounted in the craft, a support for the rotor and its driving means this support being carried by a vertical spindle rotatable on the said base and constituting a control axis for the support, a servomotor operative to rotate the said spindle and support, a valve controlling said servomotor and arranged for operation by movement of the rotor support relative to the base, a second servomotor, a lever from which extend connections to operate the rudder of the craft, means by which this lever is moved by the said second servomotor and the course of the craft thereby determined, a valve controlling this second servomotor, a floating lever, means which when the craft deviates from its set course are operative through the said rotor to actuate the valve controlling the said first mentioned servomotor and cause it to rotate the said spindle and the support carried thereby, a connection between the said spindle of the support and one end of the said floating lever such that when the support with its spindle is turned movement will be imparted to the floating lever, a connection between this floating lever and the valve of the said second servomotor, an intermediate lever pivoted on the said base and connected to that end of the floating lever opposite to that which is connected to the said spindle, an inertia device operative on this intermediate lever and offering a resistance to its movement, and a yielding connection between this intermediate lever and the said rudder operating lever.

JOHN POLLOCK BROWN.

REFERENCES CITED

The following references are of record in the file of this patent:

UNITED STATES PATENTS

| Number | Name | Date |
|---|---|---|
| 1,992,086 | Meredith | Feb. 19, 1935 |
| 2,036,914 | Brown | Apr. 7, 1936 |
| 2,146,620 | Brown | Feb. 7, 1939 |
| 2,307,941 | Meredith | Jan. 12, 1943 |